US009066351B2

(12) United States Patent  
Sundaresan et al.

(10) Patent No.: US 9,066,351 B2  
(45) Date of Patent: Jun. 23, 2015

(54) TAILORING WIRELESS TRANSMISSION STRATEGIES TO USER PROFILES

(71) Applicant: NEC Laboratories America, Inc., Princeton, NJ (US)

(72) Inventors: Karthikeyan Sundaresan, Howell, NJ (US); Mohammad A. Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 200 days.

(21) Appl. No.: 13/946,499

(22) Filed: Jul. 19, 2013

(65) Prior Publication Data

US 2014/0023005 A1     Jan. 23, 2014

Related U.S. Application Data

(60) Provisional application No. 61/673,537, filed on Jul. 19, 2012, provisional application No. 61/758,994, filed on Jan. 31, 2013.

(51) Int. Cl.  
*H04W 72/04*     (2009.01)  
*H04W 4/00*     (2009.01)

(52) U.S. Cl.  
CPC .............. *H04W 72/048* (2013.01); *H04W 4/00* (2013.01); *H04W 4/001* (2013.01)

(58) Field of Classification Search  
None  
See application file for complete search history.

(56) References Cited

U.S. PATENT DOCUMENTS

| 2008/0318585 | A1* | 12/2008 | Kauser et al. | 455/446 |
| 2010/0041408 | A1* | 2/2010 | Caire et al. | 455/446 |
| 2013/0343289 | A1* | 12/2013 | Pang | 370/329 |
| 2015/0009921 | A1* | 1/2015 | Papadopoulos | 370/329 |

OTHER PUBLICATIONS

Alamouti, S. "A Simple Transmit Diversity Technique for Wireless Communications" IEEE Journal on Select Areas in Communications, vol. 16, No. 8. Oct. 1998. pp. 1451-1458.

Aryafar, E., et al. "Design and Experimental Evaluation of Multi-User Beamforming in Wireless Lans" Proceedings of the 16th Annual International Conference on Mobile Computing and Networking, Mobicom 2010. Sep. 2010. (12 Pages).

Aryafar, E., et al. "ADAM: An Adaptive Beamforming System for Multicasting in Wireless LANs" Proceedings of the IEEE Infocom 2012. Mar. 2012. (9 Pages).

Chen, X., et al. "Practical Rate Adaptation in Mobile Environments" Seventh Annual IEEE International Conference on Pervasive Computing and Communications, PerCom 2009. Mar. 2009. pp. 204-213.

Farkas, K., et al. "Link Quality Prediction in Mesh Networks" Computer Communications, vol. 31, No. 1. Jan. 2008. (16 Pages).

(Continued)

*Primary Examiner* — Chirag Shah  
*Assistant Examiner* — Srinivasa Reddivalam  
(74) *Attorney, Agent, or Firm* — Joseph Kolodka (57) ABSTRACT

Systems and methods for data transmission include categorizing users into one of a plurality of profiles using a processor based on device and channel characteristics. Each of the plurality of profiles is mapped to one of a plurality of transmission schemes. Data is combined for a plurality of users categorized with different profiles for data transmission.

12 Claims, 3 Drawing Sheets

(56) References Cited

OTHER PUBLICATIONS

Gollakota, S., et al. "Interference Alignment and Cancellation" Proceedings of the ACM SIGCOMM 2009 Conference on Applications, Technologies, Architectures, and Protocols for Computer Communications. Aug. 2009. (12 Pages).
Hodson, H. "Wired Is the New Wireless: Spreading the Web in China" New Scientist. No. 2882. Sep. 2012. (2 Pages).
Jamieson, K. "The Soft Phy Abstraction: From Packets to Symbols in Wireless Network Design" Massachusetts Institute of Technology. Jun. 2008. (pp. 1-153).
Lin, K., et al. "Random Access Heterogeneous MIMO Networks" Proceedings of the ACM SIGCOMM 2011 Conference on Applications, Technologies, Architectures, and Protocols for Computer Communications. Aug. 2011. (12 Pages).
Maddah-Ali, M., et al. "Completely Stale Transmitter Channel State Information Is Still Very Useful" IEEE Transactions on Information Theory, vol. 58, No. 1. Jan. 2012. (19 Pages).
Rahul, H., et al. "MEGAMIMO: Scaling Wireless Capacity With User Demands" ACM SIGCOMM 2012. Aug. 2012. (12 Pages).
Rahul, H., et al. "Sourcesync: A Distributed Wireless Architecture for Exploiting Sender Diversity" Proceedings of the ACM SIGCOMM 2010 Conference on Applications, Technologies, Architectures, and Protocols for Computer Communications. Sep. 2010. (12 Pages).
Ravindranath, L. et al. "Improving Wireless Network Performance Using Sensor Hints" Proceedings of the 8th USENIX conference on Networked systems design and implementation. Mar. 2011. pp. 1-14.
Shen, W., et al. "Rate Adaptation for 802.11 Multiuser MIMO Networks" The 18th Annual International Conference on Mobile Computing and Networking, Mobicom'12. Aug. 2012. (11 Pages).
Shepard, C., et al. "ARGOS: Practical Many-Antenna Base Stations" The 18th Annual International Conference on Mobile Computing and Networking, Mobicom'12,. Aug. 2012. (12 Pages).
Shrivastava, V., et al. "Centaur: Realizing the Full Potential of Centralized WLANs Through a Hybrid Data Path" Proceedings of the 15th Annual International Conference on Mobile Computing and Networking, MOBICOM 2009. (12 Pages).
Singh, S., et al. "One Strategy Does Not Serve All: Tailoring Wireless Transmission Strategies to User Profiles" 11th ACM Workshop on Hot Topics in Networks, HotNets-Xl. Oct. 2012. (6 Pages).
Tan, K., et al. "SAM: Enabling Practical Spatial Multiple Access in Wireless LAN" Proceedings of the 15th Annual International Conference on Mobile Computing and Networking, Mobicom 2009. Sep. 2009. (12 Pages).
Tarighat, A., et al. "A Multi User Beamforming Scheme for Downlink MIMO Channels Based on Maximizing Signal-To-Leakage Ratios" IEEE International Conference on Acoustics, Speech, and Signal Processing, 2005. Mar. 2005. pp. 1129-1132.
Thiagarajan, A., et al. "Cooperative Transit Tracking Using Smart-Phones" Proceedings of the 8th International Conference on Embedded Networked Sensor Systems, SenSys 2010. Nov. 2010. (14 Pages).
Anderson, N. "Cisco Bring Your Own Device" 2013 Cisco Systems, Inc. http://bit.ly/xO4SXj. May 2013. (25 Pages).
Wireless Open-Access Research Platform "About the Warp Project" http://warp.rice.edu/trac/wiki/ about. Jun. 2013. (2 Pages).
"DAS in Action: Atlanta" PCIA and The DAS Forum. http://www.thedasforum.org/events/das-in-action-atlanta/. Jul. 2013. (3 Pages).

* cited by examiner

Categorize users of a device into one of a plurality of profiles based on device and channel characteristics, the plurality of profiles being associated with a plurality of transmission schemes
302

The plurality of profiles being associated with at least one of a diversity transmission scheme, multiplexing transmission scheme, and reuse transmission scheme
304

Allocate transmission resources between the plurality of transmission schemes
306

Schedule users on the transmission resources for each of the plurality of transmission schemes
308

Cluster transmission resources for diversity and/or multiplexing transmission schemes
310

Combine data for users having different profiles for transmission to the device
312

Re-categorize users
314

FIG. 3

TAILORING WIRELESS TRANSMISSION STRATEGIES TO USER PROFILES

RELATED APPLICATION INFORMATION

This application claims priority to provisional application Ser. No. 61/673,537 filed Jul. 19, 2012 and provisional application Ser. No. 61/758,994 filed Jan. 31, 2013, both incorporated herein by reference in their entirety.

BACKGROUND

1. Technical Field

The present invention relates to wireless transmission, and more particularly, to tailoring wireless transmission strategies to user profiles.

2. Description of the Related Art

The proliferation of smart phones and other mobile devices is changing the landscape of user connectivity and data access from predominantly static users to a mix of static and mobile users. While significant advances have been made in wireless transmission strategies to meet the increased demand for capacity, such strategies primarily cater to static users. To cope with the growing heterogeneity in data access, it becomes important to identify and optimize strategies that can cater to users of various profiles so as to maximize system performance and more importantly improve users' quality of experience. Existing solutions have focused on optimizing the transmission strategy for a single user profile. There is no single solution that can cater effectively to a pool of heterogeneous user profiles.

SUMMARY

A method for data transmission includes categorizing users into one of a plurality of profiles using a processor based on device and channel characteristics. Each of the plurality of profiles is mapped to one of a plurality of transmission schemes. Data is combined for a plurality of users categorized with different profiles for data transmission.

A system for data transmission includes a categorization module configured to categorize users into one of a plurality of profiles using a processor based on device and channel characteristics. The categorization module is further configured to map each of the plurality of profiles to one of a plurality of transmission schemes. A framing module is configured to combine data for a plurality of users categorized with different profiles for data transmission.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for tailoring wireless transmission strategies to user profiles. The present invention profiles users into three distinct categories or profiles based on their device and channel characteristics. Transmission schemes are then associated with each profile. The transmission schemes that best serves users in those categories vary distinct across user profiles. The choice of transmission schemes for the categories emphasizes multiplexing, diversity, or reuse. As such, the profiles are mapped to different transmission schemes. Data is transmitted by combining or multiplexing data for a plurality of users having different transmission schemes. Users may be periodically re-categorized or reactively re-categorized based on the network.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
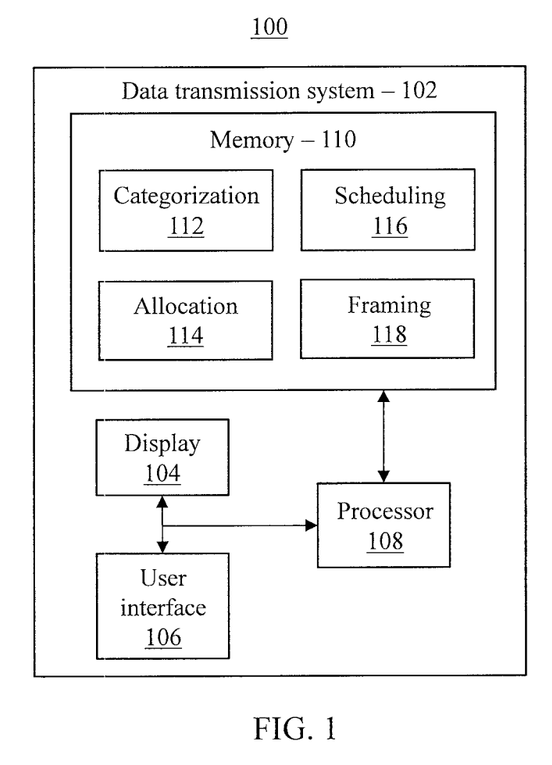
FIG. 1 shows a block/flow diagram of a system/method for data transmission, in accordance with one illustrative embodiment.

Referring now to the drawings in which like numerals represent the same or similar elements and initially to FIG. 1, a block/flow diagram for data transmission 100 is illustratively depicted in accordance with one embodiment. The system 100 provides a light weight (i.e., low complexity) framework and solution to apply appropriate transmission strategies to users in different profiles to improve system performance and users' quality of experience.

It should be understood that embodiments of the present principles may be applied in a number of different applications. For example, the present invention may be discussed throughout this application as in terms of wireless transmission. However, it should be understood that the present invention is not so limited. Rather, embodiments of the present principles may be applicable in a number of different fields. For example, the present principles may be employed to allocate computing resources. Other applications may also be applied within the context of the present invention.

The system 100 may include a system or workstation 102. The system 102 preferably includes one or more processors 108 and memory 110 for storing applications, modules and other data. The system 102 may also include one or more displays 104 for viewing. The displays 104 may permit a user to interact with the system 102 and its components and functions. This may be further facilitated by a user interface 106, which may include a mouse, joystick, or any other peripheral or control to permit user interaction with the system 102 and/or its devices. It should be understood that the components and functions of the system 102 may be integrated into one or more systems or workstations, or may be part of a larger system or workstation.

The categorization module 112 is configured to categorize a user (or a mobile device of the user) based on its mobility and channel characteristics. In a preferred embodiment, the user is categorized into one of three transmission schemes (or categories or strategies): reuse, multiplexing, and diversity. It should be understood that more or less than three transmission schemes may also be employed within the context of the present principles. The reuse scheme is associated with non-cooperating transmitters or access points (APs), while the multiplexing and diversity schemes are associated with cooperating transmitters. Note that each transmitter can individually employ single-user or multi-user MIMO (multiple-input and multiple-output) with its own clients; however, for ease of explanation, single antenna transmitters and user will be discussed.

The reuse scheme of transmission may employ, e.g., the CSMA (carrier sense multiple access) scheme or IEEE 802.11n scheme for transmission. Transmitters avoid interference in the presence of a carrier, while spatial reuse is automatically leveraged otherwise.

The diversity scheme of transmission may include sending multiple, dependent versions of a data stream via multiple transmitters to provide transmit diversity. An example is the use of space time block codes, such as distributed Alamouti space-time (ST) codes: when APs 1 and 2 employ the 2×1 Alamouti code to client 1, the resulting diversity gain scales the SNR (signal-to-noise ratio) at client 1 by $|h_{11}|^2+|h_{21}|^2$, where $h_{ij}$ is the complex channel gain between AP i and user j.

In another example, a simpler form of transmit diversity may be to transmit the same version of the data stream from multiple transmitters. Client 1 receives a coherent combination of the streams over a composite channel $\tilde{h}=h_{11}+h_{21}+h_{31}$. The power pooled from the multiple transmitters contributes to a combining SNR gain on average. This form of transmit diversity is similar in principle to broadcast and is referred to as a distributed antenna system (DAS). Unlike ST diversity, DAS does not require a receiver to estimate the individual channels from the different transmitters (no associated pilot overhead).

Accessing data from multiple transmit points simultaneously not only improves coverage, but also provides a diversity gain. Further, it does not need channel state information (between APs and clients), i.e., it obviates this feedback from client. Such schemes will broadly be referred to as diversity schemes of transmission.

In the multiplexing scheme of transmission, multiple independent data streams are transmitted concurrently to different users by converting interference into a multiplexing gain through transmitter cooperation. One example of multiplexing transmission includes a network (distributed) MIMO. The data streams for different users are shared at each of the transmission points, which are in turn tightly synchronized (at the level of symbol phase). From the physical layer perspective, this can be realized using a pre-coding scheme called zero-forcing beamforming (ZFBF), which applies a precoding matrix (V, computed from the channel matrix inverse) to send a linear combination of the data streams through each AP, such that unwanted streams (interference) cancel out at each client, thereby leaving only the desire stream.

Network MIMO (netMIMO) can allow the capacity to scale with the number of cooperating transmitters. However, this comes at the cost of channel state information (CSI) that needs to be fed back from clients in a timely manner and tight phase synchronization across APs. The variants (e.g., other forms of precoding) of these netMIMO schemes will be referred to as multiplexing schemes of transmission.

The categorization module 112 maps the, e.g., three transmission categories to user profiles based on mobility and channel characteristics. Users in enterprise networks can be categorized into one of the following three categories based on their mobility and channel coherence characteristics. 1) Mobile users with short coherence times (Mobile): coherence time (Ct) is the time over which a channel remains stable. Mobility leads to frequent channel variations which automatically results in short coherence time. Coherence time varies based on the speed of the mobile client, which can range from walking speeds of 3-4 Kmph (Tc=10 ms) to vehicular speeds of 75 Kmph (Tc=1.1 ms). 2) Static users with short coherence time (Short-Tc): static users can also experience short Tc (10-20 ms or less) due to dynamic settings where objects or other subjects (users) are mobile. It results in frequent channel variation for the client, even though the client is static. 3) Static users with long coherence time (Static): clients in static environments and in the absence of mobility experience a more stable channel (longer Tc, 100 ms or more). For example, static users in enterprises experience a more stable channel during evenings and nights, due to reduced mobility in the environment. The different transmission categories for different user profiles are then evaluated.

Static Clients: It has been found that when all clients are static, netMIMO is the most appropriate strategy, outperforming Reuse and DAS by up to 69.8%. netMIMO achieves high network rate by multiplexing three data streams to three clients at the same time. Since the channel coherence time in the static environment is large, all clients can decode their data with high reliability. Further, since the benefit of spatial reuse (absent in DAS) outweighs the diversity gain in static environments, Reuse performs better than DAS.

Mobile Clients: As the number of mobile clients in the network is varied, the performance of both netMIMO and Reuse start to degrade; the degradation for netMIMO being especially severe. On the other hand, owing to coverage and combining gain in SNR from three transmitters without reliance on any channel state information, DAS in unaffected by client mobility. Thus, DAS outperforms netMIMO and Reuse by up to 96.7% depending on the number of mobile clients.

To better understand the behavior of these transmission schemes, the received SNR of the symbols transmitted from each transmitter were recorded. During experimentation, it was found that each client in Reuse experiences a high SNR only when they are near their respective APs. In DAS, a mobile client experiences a high SNR throughout the experiment due to the coverage and the signal combining effect from the three transmitter, with about 5-6 dB of SNR gain over the highest SNR possible with Reuse (with ideal handoffs).

In addition to link degradation, mobility also impacts the benefits of spatial reuse in Reuse. Even for centralized schemes to leverage reuse, interference conflicts have to be estimated (from transmitters to various clients) to determine appropriate reuse schedules—a process that is executed only one every several packets to reduce overhead/complexity. In the presence of client mobility, tracking interference conflicts of mobile clients accurately is not practical; this in turn affects the Reuse performance with respect to such clients.

In netMIMO, the SNR goes down as soon as the client becomes mobile. The reason is that a large variation in channel phase (20°-40°) and magnitude (1-2 dB) is observed for a walking client even with a channel feedback rate of once every 10 ms. Since precoding depends on channel state information to remove interference between concurrent (parallel) streams, stale CSI resulting from such variations during mobility has a more pronounced impact on netMIMO performance.

Further, if there are N clients/AP, M APs, and S sub-carriers (or sub-channels) in an OFDM (orthogonal frequency-division multiplexing) transmission, to apply netMIMO, one needs to measure channel qualities from each of the MAPs (sequentially, M transmissions) to all the M×N clients on all the S sub-carriers (S×M×N channels). This has to be then fed back from each of the clients (M×N transmissions) to construct the channel matrix required by the precoding algorithm. Even with channel reciprocity (available only in TDM systems), one incurs the M×N transmissions from clients for estimation. Further, a few measurements per client are typically needed for stable channel estimates. Thus, it is hard to accomplish this entire process within the channel coherence times of even walking clients; this explains the acute degradation in netMIMO performance for mobile clients. To conclude, DAS was found to be best suited for mobile clients.

Short-Tc Clients: A client can experience fluctuating channel conditions even when it is not mobile due to various reasons (such as environment dynamics, multi-path, etc.). This fluctuation can result in a small channel coherence time (around 10 ms) even though the client is static. With phase variation as high as 20° even for a CSI feedback period of 10 ms, netMIMO is highly susceptible to stale CSI and the achieved rate degrades in a manner similar to that in the mobile scenario. However, the corresponding degradation in Reuse is now less pronounced. While link quality is impacted, since the topology does not change, spatial reuse is not impacted and thus, Reuse outperforms DAS (higher gains expected in larger topologies). Hence, a simple Reuse scheme is best for static clients that experience fluctuating channel conditions (i.e., small coherence time).

Two key challenges arise in realizing a practical system that can leverage the inferences discussed above: (i) how to categorize users into various profiles, and (ii) how to intelligently combine various strategies to cater to a heterogeneous set of users simultaneously and manage resources effectively between strategies. While channel coherence time is hard to measure, the state of mobility of a user that influences the former can be inferred with the help of sensors and SNR hints.

Most mobile devices (e.g., smart phones, tablets, etc.) are equipped sensors such as, e.g., global positioning system (GPS) and accelerometer sensors. While GPS can provide a good estimate of user speed outdoors (especially for vehicular users), accelerometer readings have been successfully employed to decipher user mobility indoors with high accuracy. While accelerometer data is used to determine whether a mobile device is static or mobile, it can also be used to determine user mobility at walking speed. For each new accelerometer sample, the standard deviation of the sample's magnitude is computed over a sliding window (w) of samples. If the standard deviation in a window exceeds a threshold (a), movement is detected. If it is within the threshold for n successive windows, the device is deemed stationary. The values w=5, a=0.15 m/s$^2$, and n=10 have been shown to have an accuracy over 95%.

While sensor hints provide high accuracy, they may not be available with all devices. In such cases, SNR hints may be used to decipher user mobility with accuracy over 85%. The variation in the average SNR of a client during a given time period is used for this purpose. Consider a simple experiment where a mobile client is moving away from the AP at walking speed. The SNR variation over time is recorded. It has been found that SNR variation for a mobile client is high due to the dynamic environment. More importantly, it was found that this variation is consistently more than 10 dB.

Finally, netMIMO's sensitivity to fluctuating channels can also be effectively used for categorization. When channels are measured from the transmitters to users and the precoding matrix is computed for netMIMO, one can easily estimate the SINR (signal to interference plus noise ratio) expected at users when netMIMO is applied. When netMIMO is executed, the resulting SINR or rate can be measured and then compared against the estimated value. A significant drop in measured rate is expected if netMIMO can no longer be supported by the user's channel.

Thus, it was found that while sensor and SNR hints are strong indicators of mobility, significant rate discrepancies can easily predict lack of support for netMIMO.

The categorization module 112 leverages the above indicators as triggers to categorize users with high accuracy. When a user joins the network, with the help of sensor and/or SNR hints, it first determines if the user is mobile and, if so, categorizes it to be a DAS user. Otherwise, it aggressively assumes that the user is a netMIMO user.

In addition to the user's netMIMO SINR, it can also estimate (from the measured channels) the SNR (and hence the rate) the user would receive if the transmitters were to instead operate in DAS and reuse (single transmission per user) modes. If there is a significant difference between the estimated and observed netMIMO rate (e.g., by more than 50%) for the user, then the user is removed from the netMIMO category. If the user cannot support netMIMO and if its sensor and/or SNR hints do not indicate it to be a DAS user, only then the user is classified as a Reuse user.

Since a user's profile can change temporally, categorization cannot be a one-time process but must be implicitly integrated into the system. If the user is a netMIMO or Reuse user and if its profile degrades to a lower multiplexing (rate) category (netMIMO→reuse→DAS), then this would automatically be reflected in its rate (for netMIMO) and sensor/SNR hints (for Reuse). Using these triggers, the user can then be appropriately assigned to DAS or reuse. However, to determine if a non-netMIMO user can be moved to a higher multiplexing category (DAS→reuse→netMIMO), categorization module 112 periodically (e.g., every 5 seconds) moves the user to netMIMO category and performs categorization to determine its appropriate category.

Allocation module 114 is configured to allocate available time-frequency resources between the, e.g., three transmission categories based on traffic load, priority, and fairness. The ideal scenario would be to partition the network into disjoint regions, where only one strategy needs to be applied in each region. This would allow frequency and time resources to be reused by strategies across the network. While such scenarios can occur (e.g., a big conference hall with only static users on one end and a cafeteria with only mobile users on the other end of a floor), they are not common. In reality, users of different profiles are inter-twined in various regions of the network (e.g., static and mobile users in a cafeteria). Hence, it becomes inevitable that different transmission strategies are combined (although appropriate, the term "multiplex" will be used to refer to, e.g., netMIMO schemes) in the time and/or frequency domains to serve users of different profiles in any given region.

The allocation module 114 may combine the transmission categories in the frequency domain, which allows it to leverage power pooling benefits from the transmitters. The sub-carriers in an OFDM system (say N in total) would be split orthogonally (e.g., $N_m$ to netMIMO, $N_d$ to DAS, N-$N_m$-$N_d$ to Reuse) between the various transmission categories and used by the transmitters to serve their respective clients anywhere in the network. On the downlink (AP→users), when an AP (with fixed transmit power) has users that do not cover all the profiles, the power on the sub-carriers assigned to the unused strategies will be pooled to the sub-carriers assigned to the strategies in operation. This in turn results in a higher SNR on the sub-carriers in operation, a gain termed as power pooling gain. Note that when strategies are combined in the time-domain, all sub-carriers are used for a given strategy at a time and hence there is no room for power poling.

The traffic load for each of the transmission categories is determined based on the traffic carried by users in the respective categories, in the entire network. The different user profiles are weighted ($v_i$ based on priority or fairness), and the allocation of number of sub-carriers to each of the strategies across the entire network is made proportional to their weighted traffic load $$\left(\text{e.g.,}\ N_i = \frac{v_i N}{\sum_i v_i}\right).$$

It should be understood that other weight choice may also be employed. Among the sub-carriers allocated to a strategy, users in the respective profile are then scheduled based on a desired fairness model (e.g., proportional fairness). Since resource management is tightly coupled with user categorization, it continuously adapts to dynamics in user profiles. Once resources have been allocated to different transmission categories (or user profiles), the next step is to determine how the transmitters serving users in different categories access these resources.

Scheduling module 116 is configured to schedule users associated with a same transmitter and same transmission category. While the reuse transmission category can be realized in a completely distributed manner, cooperation strategies, such as netMIMO and DAS, do require a central entity (e.g., central controller). Given this, the scheduling module 116 adopts a centralized approach for downlink medium access, whereby transmissions are scheduled by the central controller. Further, since the resources allocated to the strategies are orthogonalized in the frequency domain, it is sufficient to consider scheduling within each of the transmission strategies in isolation.

For netMIMO, the ideal operation would be to execute one large netMIMO between all the transmitters in the network and the users in the netMEMO category. While this would provide the maximum number of concurrent streams (scaling with the number of transmitters, say T), this would also require the computation of the inverse of matrices of size T×T (to determine precoding matrix), not to mention the overhead of synchronizing all the transmitters, measuring and feeding back CSI from all transmitters to all netMIMO users and sharing of all netMIMO users' data streams across all transmitters. Given the complexity involved, this is not desirable, especially for large networks, where the central controller manages several tens of transmitters.

Similarly, in the case of DAS, involving all transmitters in one big DAS setup eliminates the need to identify appropriate transmitters for clients, especially when they are mobile and indoors. However, the cost incurred is that the data served to a user on a sub-carrier is broadcast to all the transmitters, thereby significantly limiting reuse in the network. Given the users' mobility may be restricted to regions of the network for a given period of time, this could amount to gross under-utilization of the spectrum.

To address these issues, the scheduling module 116 employs a clustered approach to executing netMIMO and DAS to strike a balance between coverage and capacity. It groups the set of transmitters into smaller, contiguous clusters. netMIMO and DAS are executed only within each cluster and interference between clusters is avoided either in the time or frequency domain. Executing cooperation strategies at the cluster granularity ensures feasibility for netMIMO, while it allows for the reuse of spectrum across clusters for DAS. The maximum cluster size (Q, decided based on practical considerations) as well as the clusters themselves can be different for netMIMO and DAS.

In determining these clusters, a topology-aware cluster algorithm is designed. The underlying principle is that transmitters within each cluster should have strong mutual interference (ideally they should form a clique in the conflict graph), in order to maximize the cooperation or combining gain. Moreover, transmitters across different clusters should be weakly coupled so as to maximize frequency reuse opportunities. The scheduling module 116 adopts a graph coarsening approach to clustering (executed by the central controller), whereby neighboring vertices are consolidated (merged) recursively based on a desired metric.

Step 1: For each transmission strategy, the entire network can be represented by a conflict graph G(V,E), where transmitters constitute the vertices V and an edge (u,v)∈E indicates interferences (to clients) between transmitters u and v operating under the given transmission strategy.

Step 2: For each randomly selected vertex v, the algorithm finds the neighbor u that together with v suspends the maximum clique locally. Then, it merges u,v and their edge into a single vertex u', which is added into the conflict graph.

Step 3: This process is applied recursively on the new conflict graph, until no more vertices can be merged or the cluster size constraint Q is reached. Each vertex in the resultant conflict graph contains multiple transmitters in the original network, which then form the desired clusters.

Employing heaviest clique to be the coarsening metric helps create clusters with good cooperation gain, while also reducing the interference across clusters.

Figure 2:
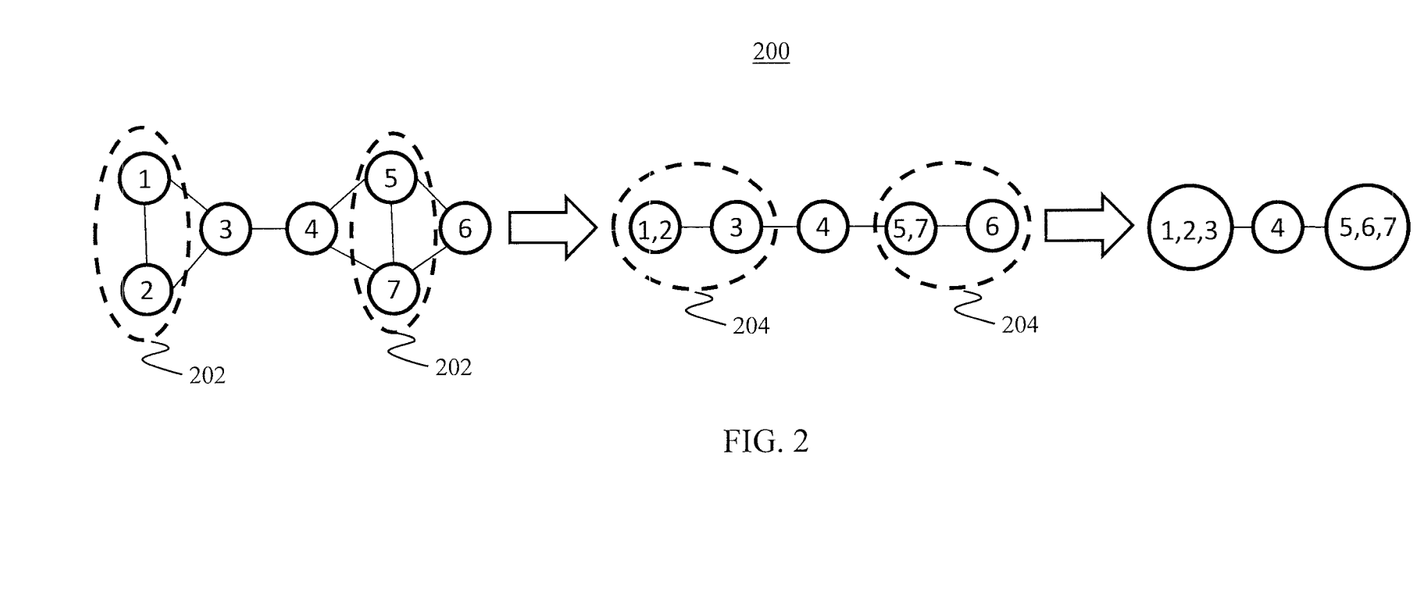
FIG. 2 shows a block/flow diagram of graph coarsening, in accordance with one illustrative embodiment.

Referring for a moment to FIG. 2, with continued reference to FIG. 1, graph coarsening 200 is illustratively depicted in accordance with one embodiment. Graph coarsening is applied to cluster transmitters, with a maximum cluster size Q=3. In a first stage, clusters 202 are identified to cluster transmitters 1 and 2, and 5 and 7. In a second stage, the process is recursively performed to identify clusters 204 to cluster transmitters 1,2 and 3, and 5,7 and 6. The result is clusters 1,2,3; 4; and 5,6,7.

Referring back to FIG. 1, a feature of clustering in net-MIMO and DAS is that transmitters on the edge of the clusters will receive interference from neighboring clusters, albeit only from transmitters operating with the same strategy. Note that, instead of allocating sub-carriers to strategies across the entire network, one can envision varied allocations for different clusters based on their local traffic demand. However, this would result in cross-strategy interference across clusters that is challenging to address and is hence avoided in the present invention. To eliminate inter-cluster interference, the scheduling module 116 takes the following approach.

Step 1: It considers a conflict graph with clusters themselves as vertices (an edge exists between adjoining clusters) and performs a simple, (degree-based) greedy multi-coloring on the set of sub-carriers allocated to the strategy.

Step 2: The orthogonal sets of sub-carriers assigned to the clusters are then used by the cluster-edge transmitters only to remove inter-cluster interference. All sub-carriers allocated to the transmission strategy are used by the cluster-interior transmitters, thereby allowing for efficient reuse of resources across all clusters.

With the reuse strategy, there is no clustering (or equivalently, the cluster size is one with every transmitter being an edge transmitter). Thus, a conventional conflict graph with transmitters can be formed and a greedy multi-coloring on the set of sub-carriers allocated to reuse strategy will determine the set of frequencies for operation at each transmitter.

Once the set of sub-carriers for operation at each transmitter for a given strategy is determined, the next step is to schedule clients. Given that there may be multiple clients associated with a transmitter, scheduling must be performed to ensure long-term throughput fairness for clients.

Reuse and DAS: Each client i is associated with a weight w; and a time-average throughput $R_i$. In each time frame t, each transmitter schedules a client (from among those in the same strategy) with the maximum weighted throughput (arg $\max_i w_i r(t)$), and performs the following update after the packet transmission:

$$R_i \leftarrow \alpha r(t) + (1-\alpha)R_i, \text{ and } w_i \leftarrow R_i^{-1}$$

where r(t) is the throughput achieved in the current time frame and $\alpha$ is an exponential filtering coefficient. By configuring $w_i$ to be the inverse of $R_i$, the above update is proven to achieve long-term proportional fairness for clients and is equivalent to maximizing the aggregate utility of users in the strategy (with each user's utility given by $\log(R_i)$).

netMIMO: Here, scheduling is more sophisticated as each transmission involves multiple clients. Different grouping of clients results in different crosstalk interference and hence different individual throughputs. The scheduling module 116 groups clients using a simple greedy approach, executed in the beginning of each time frame (more sophisticated approaches are also possible). It iteratively searches for the next client that provides the maximum increase to the weighted sum throughput R(t), until no clients can be added. A client's weight $w_i$ is updated in a similar way to that with reuse and DAS.

When a set of clients are grouped for netMIMO transmission, the expected rate of each is computed assuming zero-forcing beamforming with a maximum power constrain on each transmitter. Suppose M is the channel matrix from all transmitters in the cluster to the set of selected clients I', with rows indexing the clients and columns the transmitters. The zero-forcing precoding matrix is computed as the pseudo-inverse of M: $D=M'(MM')^{-1}$. To respect the per-transmitter power constraint, elements of D must be normalized by $\sqrt{P}$, where $P=\arg \max_k \Sigma_{i=1}^{|I'|} |M_{ki}|^2$. Then for client k, the expected rate can be estimated as $R_k = W \log(1+\Sigma_j M_{ij} D_{ji}/(\sqrt{P} N_0))$, where $N_0$ is the receiver's noise level and W the bandwidth.

The framing module 118 is configured to combine multiple strategies in the frequency domain at a transmitter, which amounts to transmitting to multiple clients in a single frame. Similar to OFDMA (orthogonal frequency-division multiple access), the transmission frames in the present invention are two-dimensional in time and frequency (time symbols and sub-carriers). The frame consists of a preamble followed by a control region spanning two symbols (and all sub-carriers). The control region contains information on which sub-carriers carry data meant for which users as well as the MCS (modulation and coding rate) to be used for decoding data. The controller ensures that data for users on a specific strategy are scheduled only on sub-carriers assigned for that strategy. Training or reference signals/pilots are embedded in the frame to enable frequency synchronization, channel measurement, and CSI reporting for netMIMO.

Compared to OFDM, whereby transmission to a single user is made in a frame, OFDMA would incur slightly higher control overhead (due to multi-user transmission). However, it has been shown that the benefits of user multiplexing in OFDMA and its associated frequency (multi-user) diversity and power pooling gains outweigh the additional overhead incurred. Further, if needed, the number of users scheduled at a transmitter within a strategy can be limited to balance diversity gains with overhead.

While netMIMO and reuse users are re-categorized automatically by categorization module 112 as and when their channel state changes to one with lesser multiplexing gain, reuse and DAS users are explicitly moved to netMIMO category periodically to see if they can access a state with higher multiplexing gain.

Advantageously, the present invention provides a lightweight (i.e., low complexity) framework and solution to apply appropriate transmission strategies to users in different profiles to improve system performance and users' quality of experience.

Figure 3:
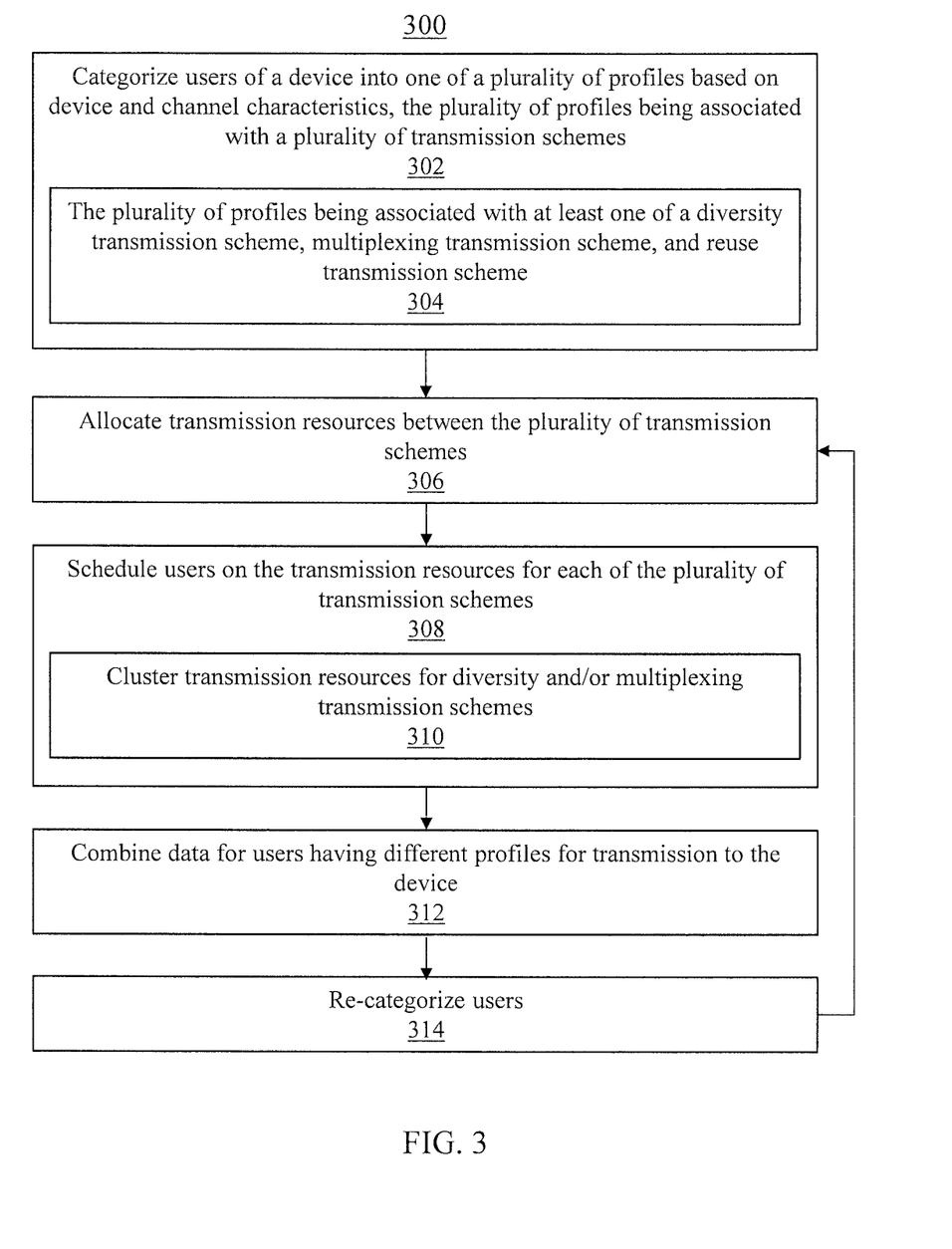
FIG. 3 shows a block/flow diagram of a system/method for data transmission, in accordance with one illustrative embodiment.

Referring now to FIG. 3, a block/flow diagram showing a method for tailoring wireless transmission strategies to user profiles 300 is illustratively depicted in accordance with one embodiment. In block 302, users of a device (e.g., a mobile device) are categorized into one of a plurality of profiles based on device and channel characteristics, wherein the plurality of profiles is associated with a plurality of transmission schemes. In block 304, the plurality of transmission schemes includes a diversity transmission scheme (e.g., DAS, ST block codes), a multiplexing transmission scheme (e.g., netMIMO, adaptive beamforming), and a reuse transmission scheme (e.g., CSMA, IEEE 802.11n). The device characteristics may include mobility state, batter state, place and time of data access, etc., which may be determined based on sensor data from the device. Channel characteristics may include the SNR.

Categorizing first includes determining if a user is a diversity transmission scheme user (i.e., if the user is mobile based on sensor data). Otherwise, the user is assumed to be a multiplexing transmission scheme user. Based on estimated and observed rates for the multiplexing transmission scheme, if there is a significant difference between the estimated (from CSI feedback) and measured multiplexing rates (e.g., by more than a threshold amount, such as 50%) for the user, the user is removed from the multiplexing transmission scheme. If the user cannot support the multiplexing transmission scheme and the device and channel characteristics do not indicate the user as a diversity transmission scheme user, the user is classified as a reuse transmission scheme user.

In block 306, transmission resources (e.g., transmitters) are allocated between the plurality of transmissions schemes. Sub-carriers and/or time slots in a frame or across multiple frames are appropriately partitioned between strategies based on traffic load of users in the associated categories, priority, and fairness.

In block 308, users are scheduled on the transmission resources for each of the plurality of transmission schemes. Preferably, users are scheduled at each transmission resource for each transmission strategy based on a fairness model, e.g., proportional fairness. In block 310, scheduling may include clustering transmission resources for diversity and/or multiplexing transmission schemes. Transmission resources are clustered for the multiplexing transmission scheme to balance between multiplexing gain and complexity, and in the diversity transmission scheme to balance between coverage and capacity. Preferably, a heavy clique graph coarsening approach is employed for the clustering. Transmission resources in the cluster interior use all time-frequency resources assigned to the transmission scheme, while transmission resources on the cluster edge operate on a subset of resources as determined by multi-coloring approaches to avoid interference across clusters. For the reuse transmission scheme, transmitters directly employ a multi-coloring approach to determine their time-frequency resources of operation.

In block 308, data for users having different profiles are combined for transmission to the device. The data may be combined in the time and/or frequency domains and simultaneously transmitted from each transmission resource.

In block 301, users are re-categorized. Multiplexing and reuse transmission scheme users are re-categorized automatically as and when their channel state changes to one with lesser multiplexing gain. Reuse and diversity users are explicitly moved to the multiplexing transmission scheme periodically to determine if they can access a state with a higher multiplexing gain.

Having described preferred embodiments of a system and method tailoring wireless transmission strategies to user profiles (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for data transmission, comprising:
categorizing users into one of a plurality of profiles using a processor based on device and channel characteristics;
mapping each of the plurality of profiles to one of a plurality of transmission schemes; and
combining data for a plurality of users categorized with different profiles for data Transmission,
wherein the plurality of transmission schemes include a diversity transmission scheme, a multiplexing transmission scheme, and a reuse transmission scheme, and
wherein categorizing includes:
determining whether a user is a diversity transmission scheme user based on the device and channel characteristics;
if the user is not a diversity transmission scheme user, categorizing the user as a multiplexing transmission scheme user; and
comparing estimated and measured multiplexing rates such that if the comparing is greater than a threshold, the user is categorized as a reuse transmission scheme user.

2. The method as recited in claim 1, wherein the diversity transmission scheme includes at least one of a distributed antenna system and space time block codes; the multiplexing transmission scheme includes at least one of multi-user multiple-input and multiple-output and adaptive beamforming; and the reuse transmission scheme includes at least one of carrier sense multiple access and IEEE 802.11n.

3. The method as recited in claim 1, further comprising allocating transmission resources in at least one of time and frequency between the plurality of transmission schemes based on at least one of traffic load, priority, and fairness.

4. The method as recited in claim 1, further comprising scheduling users of transmission resources for each of the plurality of transmission schemes.

5. The method as recited in claim 1, further comprising re-categorizing users based on changes to a channel state.

6. The method as recited in claim 1, further comprising periodically re-categorizing reuse and diversity transmission scheme users to the multiplexing transmission scheme.

7. A system for data transmission, comprising:
a categorization module configured to categorize users into one of a plurality of profiles using a processor based on device and channel characteristics;
the categorization module further configured to map each of the plurality of profiles to one of a plurality of transmission schemes; and
a framing module configured to combine data for a plurality of users categorized with different profiles for data transmission,
wherein the plurality of transmission schemes include a diversity transmission scheme, a multiplexing transmission scheme, and a reuse transmission scheme, and
wherein the categorization module is further configured to:
determine whether a user is a diversity transmission scheme user based on the device and channel characteristics;
if the user is not a diversity transmission scheme user, categorize the user as a multiplexing transmission scheme user; and
compare estimated and measured multiplexing rates such that if the comparing is greater than a threshold, the user is categorized as a reuse transmission scheme user.

8. The system as recited in claim 7, wherein the diversity transmission scheme includes at least one of a distributed antenna system and space time block codes; the multiplexing transmission scheme includes at least one of multi-user multiple-input and multiple-output and adaptive beamforming; and the reuse transmission scheme includes at least one of carrier sense multiple access and IEEE 802.11n.

9. The system as recited in claim 7, further comprising an allocation module configured to allocate transmission resources in at least one of time and frequency between the plurality of transmission schemes based on at least one of traffic load, priority, and fairness.

10. The system as recited in claim 7, further comprising a scheduling module configured to schedule users of transmission resources for each of the plurality of transmission schemes.

11. The system as recited in claim 7, wherein the categorization module is further configured to re-categorize users based on changes to a channel state.

12. The system as recited in claim 7, wherein the categorization module is further configured to periodically re-categorize reuse and diversity transmission scheme users to the multiplexing transmission scheme.

\* \* \* \* \*